US012412047B2

(12) United States Patent
Iyer et al.

(10) Patent No.: US 12,412,047 B2
(45) Date of Patent: Sep. 9, 2025

(54) COMPUTERIZED DATA AGGREGATION

(71) Applicant: Kyndryl, Inc., New York, NY (US)

(72) Inventors: Balamukundan G. Iyer, Chennai (IN); Vinay Kumar Gajanana Hegde, Bangalore (IN); Omar Odibat, Cedar Park, TX (US)

(73) Assignee: Kyndryl, Inc., New York, NY (US)

( * ) Notice: Subject to any disclaimer, the term of this patent is extended or adjusted under 35 U.S.C. 154(b) by 273 days.

(21) Appl. No.: 18/325,327

(22) Filed: May 30, 2023

(65) Prior Publication Data
US 2024/0403154 A1 Dec. 5, 2024

(51) Int. Cl.
*G06F 40/40* (2020.01)
*G06F 11/07* (2006.01)

(52) U.S. Cl.
CPC .......... *G06F 40/40* (2020.01); *G06F 11/0769* (2013.01)

(58) Field of Classification Search
None
See application file for complete search history.

(56) References Cited

U.S. PATENT DOCUMENTS

| | | | |
|---|---|---|---|
| 7,716,592 B2 | 5/2010 | Tien et al. | |
| 9,600,471 B2 * | 3/2017 | Bradshaw | G06F 40/289 |
| 10,395,189 B2 | 8/2019 | Farooq et al. | |
| 10,628,603 B1 | 4/2020 | de Boer et al. | |
| 10,931,775 B2 | 2/2021 | Morton et al. | |
| 11,989,659 B2 * | 5/2024 | Nichols | G06N 5/022 |
| 12,243,653 B1 * | 3/2025 | Ziegler | G16H 10/20 |
| 2008/0034314 A1 | 2/2008 | Louch et al. | |
| 2012/0124149 A1 * | 5/2012 | Gross | G06F 16/3322 709/206 |
| 2012/0310923 A1 * | 12/2012 | Ross | G06F 16/24556 707/E17.061 |

(Continued)

FOREIGN PATENT DOCUMENTS

| | | |
|---|---|---|
| CA | 2637982 C | 8/2016 |
| CN | 106649223 A | 5/2017 |

OTHER PUBLICATIONS

IPCOM00025865d, "System and method for intelligently presenting analytical data in dashboards", Jun. 1, 2019, 5 pages.

*Primary Examiner* — Douglas Godbold
(74) *Attorney, Agent, or Firm* — CANTOR COLBURN LLP; Erik Swanson

(57) ABSTRACT

Disclosed embodiments provide computer-implemented techniques for aggregating of data involving multiple domains in the format of a news bulletin or "newsletter" format. For various situations, this format can provide a quicker and more comprehensive understanding than is achievable with a visual dashboard. In disclosed embodiments, multiple domains are specified, where each domain can include a subject or category. One category is selected as a major domain. Other categories, referred to as satellite domains are also specified. A user provides scores that indicate the semantic importance of each satellite domain. A mathematical distance between each satellite domain and the major domain is computed based on the scores. Based on the mathematical distances, percentages of articles pertaining to each domain are computed, and used in assembling customized data that is output in a news bulletin format.

18 Claims, 10 Drawing Sheets

(56) References Cited

U.S. PATENT DOCUMENTS

| | | | |
|---|---|---|---|
| 2014/0100901 A1* | 4/2014 | Haine | G06F 40/186 |
| | | | 705/7.11 |
| 2014/0289231 A1* | 9/2014 | Palmert | G06F 40/284 |
| | | | 707/723 |
| 2017/0099390 A1* | 4/2017 | Crowe | H04M 3/5175 |
| 2018/0165724 A1 | 6/2018 | Rakshit et al. | |
| 2019/0205304 A1* | 7/2019 | Tripathi | G06F 16/24578 |
| 2020/0065387 A1* | 2/2020 | Matthews | G06F 3/0484 |
| 2021/0065091 A1* | 3/2021 | Bhattacharyya | |
| | | | G06Q 10/06375 |
| 2021/0103865 A1* | 4/2021 | Anisingaraju | G06F 16/367 |
| 2021/0151056 A1* | 5/2021 | Trim | G06F 9/455 |
| 2021/0191837 A1* | 6/2021 | Gandhewar | G06F 11/0769 |
| 2021/0303569 A1* | 9/2021 | Morganstern | G06F 16/24535 |
| 2022/0121807 A1* | 4/2022 | Seul | G06F 8/30 |
| 2022/0155924 A1* | 5/2022 | Campbell | G06F 3/0484 |
| 2022/0261602 A1* | 8/2022 | Ma | G06F 40/20 |
| 2022/0277044 A1* | 9/2022 | Kim | G06F 16/93 |
| 2023/0169272 A1* | 6/2023 | Brantley | G10L 15/26 |
| | | | 704/231 |
| 2023/0245646 A1* | 8/2023 | Parthasarathy | G06F 40/35 |
| | | | 704/231 |
| 2023/0252054 A1* | 8/2023 | Hou | G06F 16/287 |
| | | | 707/603 |
| 2024/0362409 A1* | 10/2024 | Kuan | G06F 40/30 |
| 2024/0428780 A1* | 12/2024 | Parthasarathy | G10L 15/26 |

* cited by examiner

| Domain | Score | Weight | Percentage Value |
|---|---|---|---|
| Business - b | 3 | 3.605551275 | 13.31124348 |
| IT - i | 3 | 3.605551275 | 13.31124348 |
| Apps - a | 4 | 16 | 59.07528216 |
| End User - e | 1 | 3.8729983346 | 14.29984489 |
| | total | 27.08408859 | |

FIG. 6

LOGWARN 192.0.2.12 - - [18/Mar/2023:17:09:18 +0000]
"LoadBalancerFailover - Code 3"

LOGERROR 192.168.86.53 - - [18/Mar/2023:17:09:23 +0000]
"GET / HTTP/1.1" "companydomain.xyz 460 - Connection Closed
Unexpectedly"

LOGWARN 192.0.2.12 - - [18/Mar/2023:17:10:42 +0000]
"LoadBalancerFailover - Complete"

FIG. 9

COMPUTERIZED DATA AGGREGATION

FIELD

The present invention relates generally to information processing, and more particularly, to computerized data aggregation.

BACKGROUND

Data lakes are repositories that enable organizations to store structured, semi-structured, and/or unstructured data at any scale. Data lakes can store a variety of data types, including raw data, metadata, machine learning models, analytical data, and so on. They also provide a high degree of flexibility, allowing users to access data in real-time and perform advanced analytics on large datasets. Data lakes can store large amounts of data from multiple sources, such as social media, IoT devices, and customer interactions. They are also commonly used in big data and machine learning applications, where large datasets need to be analyzed quickly and efficiently.

For humans, comprehending large amounts of complex data can be a challenging task for several reasons. One reason is 'data overload.' When presented with too much data at once, it can be overwhelming and difficult to extract meaningful insights. Another major factor is data complexity. Some types of data may be inherently complex and difficult to understand, such as data from sensors or machine learning models. Despite these challenges, large amounts of data are being generated continuously, contributing to an ever-growing amount of data that needs to be analyzed and understood in order to make informed decisions.

SUMMARY

In one embodiment, there is provided a computer-implemented method for data processing, comprising: computing, for a major domain and a set of satellite domains, a respective plurality of domain weights based on a score for the major domain and a set of scores respective to the set of satellite domains; computing a respective plurality of percentage values based on the plurality of domain weights; aggregating data, wherein the aggregating is based on individual computed percentage values of the plurality of percentage values; and outputting, using natural language processing, customized data having a plurality of text sentences generated based on the aggregated data, the plurality of text sentences summarizing information from at least one of the major domain and the set of satellite domains.

In another embodiment, there is provided an electronic computation device comprising: a processor; a memory coupled to the processor, the memory containing instructions, that when executed by the processor, cause the electronic computation device to: compute, for a major domain and a set of satellite domains, a respective plurality of domain weights based on a score for the major domain and a set of scores for the set of satellite domains; compute a respective plurality of percentage values based on the plurality of domain weights; aggregate data, wherein the aggregating is based on individual computed percentage values of the plurality of percentage values; and output, using natural language processing, customized data having a plurality of text sentences generated based on the aggregated data, the plurality of text sentences summarizing information from at least one of the major domain and the plurality of satellite domains.

In yet another embodiment, there is provided a computer program product for an electronic computation device comprising a computer readable storage medium having program instructions embodied therewith, the program instructions executable by a processor to cause the electronic computation device to: compute, for a major domain and a set of satellite domains, a respective plurality of domain weights based on a score for the major domain and a set of scores for the set of satellite domains; compute a respective plurality of percentage values based on the plurality of domain weights; aggregate data, wherein the aggregating is based on individual computed percentage values of the plurality of percentage values; and output, using natural language processing, customized data having a plurality of text sentences generated based on the aggregated data, the plurality of text sentences summarizing information from at least one of the major domain and the plurality of satellite domains.

BRIEF DESCRIPTION OF THE DRAWINGS

FIG. 6 is a figure showing example datasets in accordance with embodiments of the present invention.

FIG. 9 is an exemplary log file used as input to embodiments of the present invention.

Figure 1:
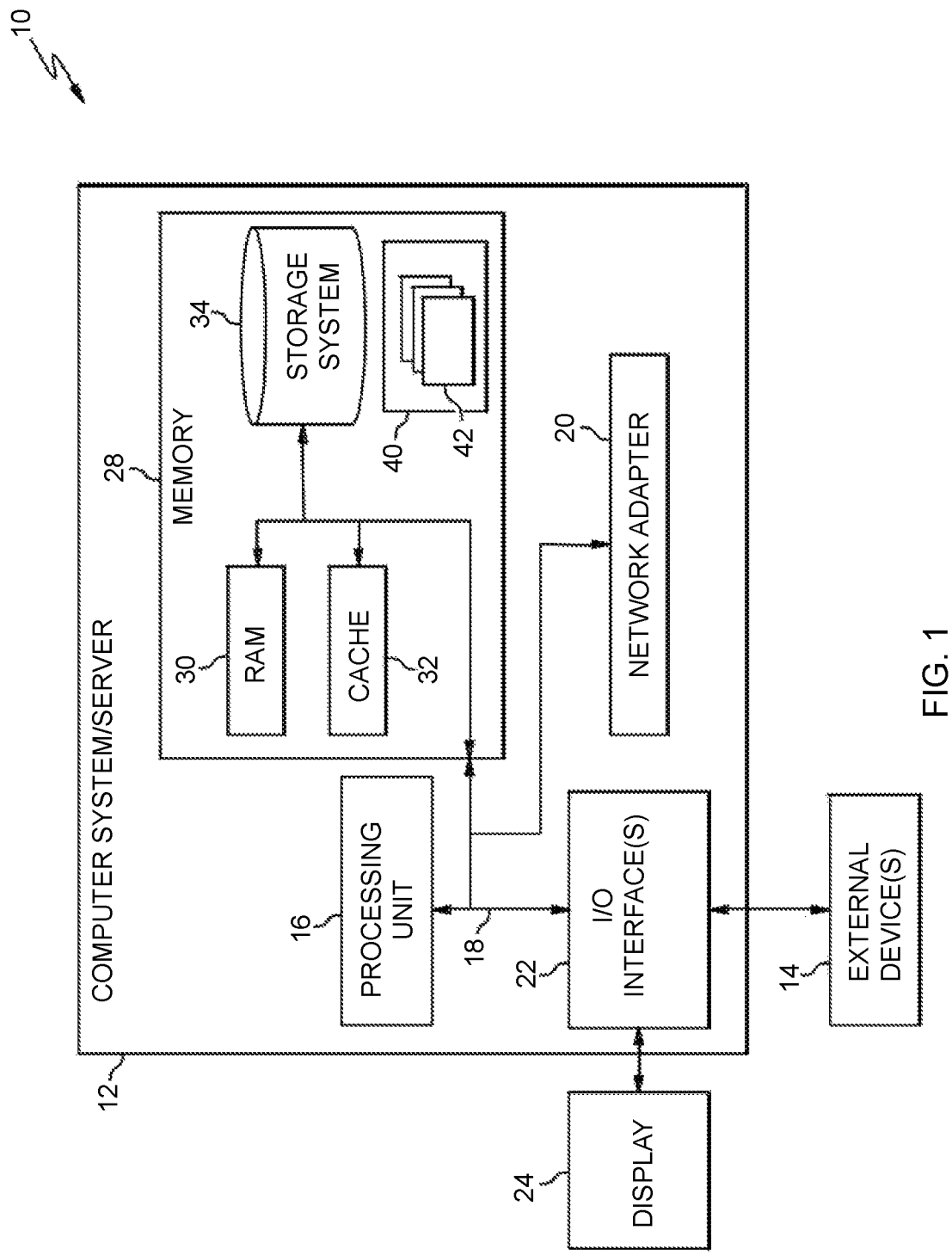
FIG. 1 depicts a cloud computing node according to an embodiment of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

With ever-increasing amounts of data, people often turn to visual representations, referred to as "dashboards," to get an overview of the information in graphical form. While graphs can be effective in two or three dimensions, they quickly lose effectiveness once the number of dimensions exceeds three. For example, visually representing data in ten or more dimensions can result in something incomprehensible.

Disclosed embodiments mitigate the aforementioned issues by providing an aggregation of data involving multiple domains in the format of a news bulletin or "newsletter" format. For various situations, this format can provide a quicker and more comprehensive understanding than is achievable with a visual dashboard. In disclosed embodiments, multiple domains are specified, where each domain can include a subject or category. One category is selected as a major domain. Other categories, referred to as satellite domains, are also specified. A user provides scores that indicate the semantic importance of each satellite domain. A mathematical distance between each satellite domain and the major domain is computed based on the scores. Based on the mathematical distances, percentages of articles pertaining to each domain are computed, and used in assembling customized data that is output in a news bulletin format. The customized data enables improvements in the technical field of data aggregation and can provide a quicker and more efficient ingest of information.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Computer system/server 12 typically includes a variety of computer system readable media. Such media may be any available media that is accessible by computer system/server 12, and it includes both volatile and non-volatile media, removable and non-removable media.

Program/utility 40, having a set (at least one) of program modules 42, may be stored in memory 28 by way of example (which can include cache 32, RAM 30, and storage system 34), and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
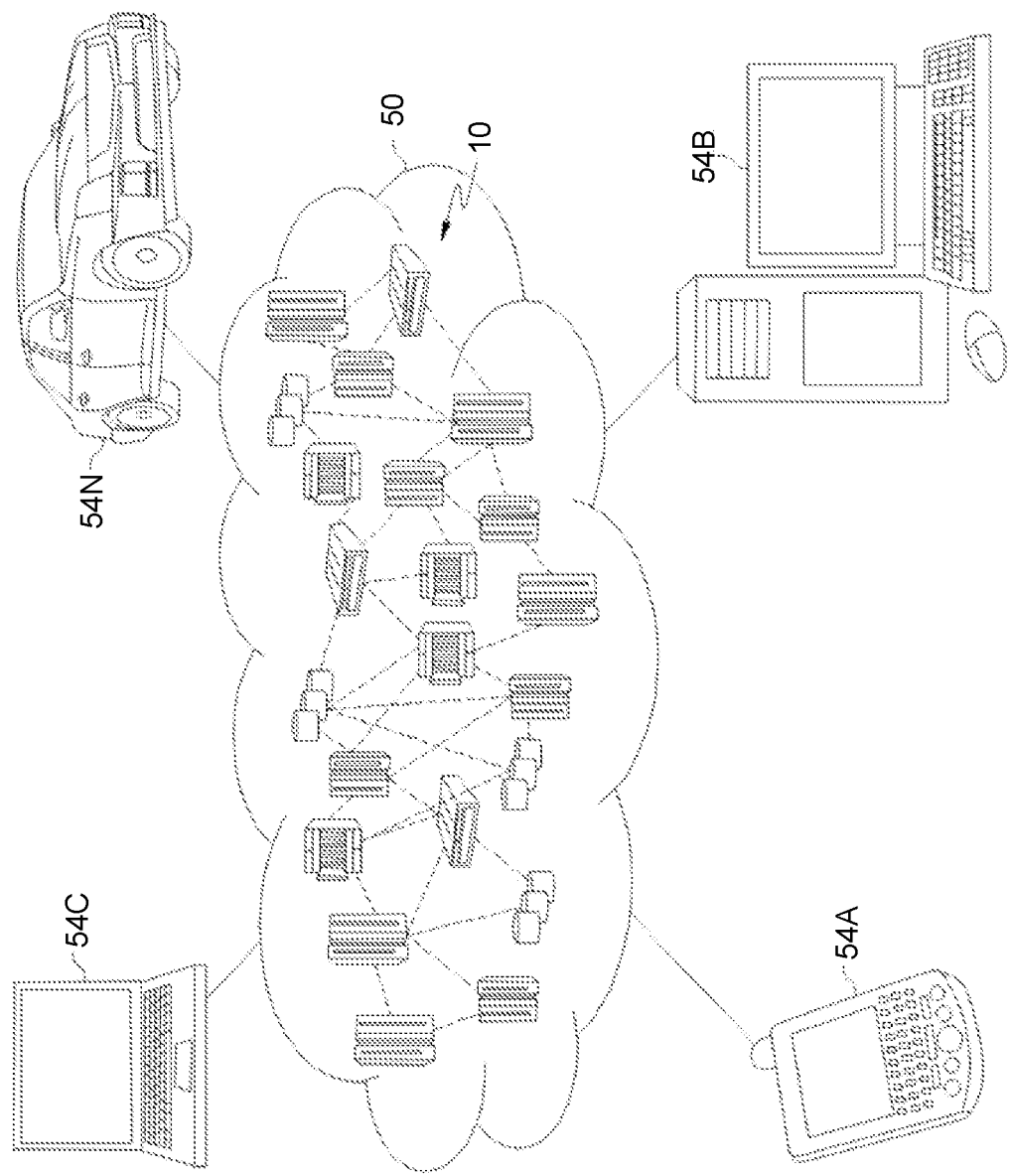
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
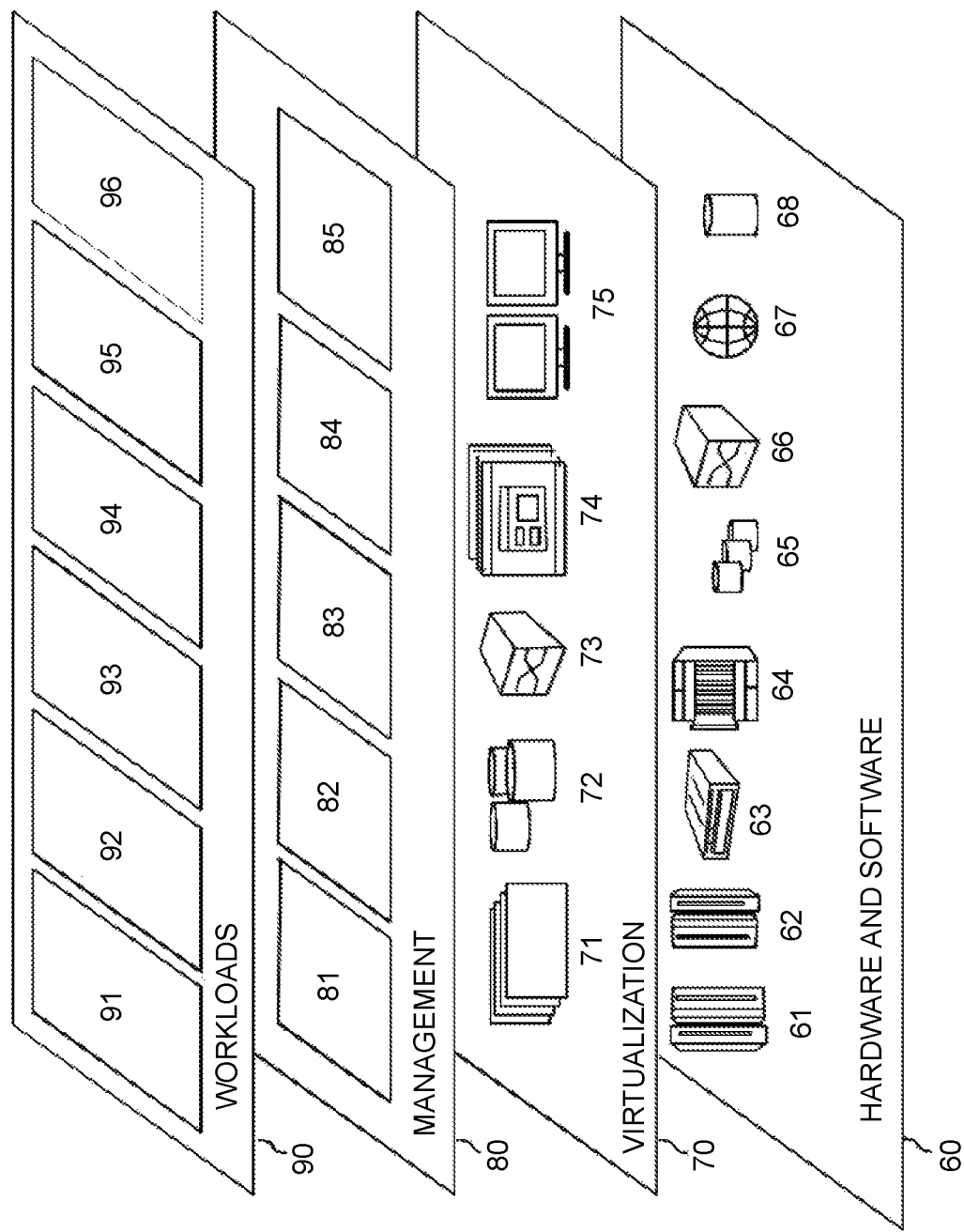
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and customized data aggregation system 96.

Implementations of the invention may include a computer system/server 12 of FIG. 1 in which one or more of the program modules 42 are configured to perform (or cause the computer system/server 12 to perform) one or more functions of the customized data aggregation system 96 of FIG. 3. For example, the one or more of the program modules 42 may be configured to: obtain a selection for a major domain; obtain a score for the major domain; obtain scores for a plurality of satellite domains; compute a satellite domain weight for each satellite domain of the plurality of satellite domains; compute a percentage value for the major domain and each satellite domain based on a weight of the major domain and the satellite domain weight for each satellite domain; aggregate data, wherein the aggregating is based on each computed percentage value; generate a plurality of text sentences based on the aggregated data; and output customized data, wherein the plurality of data includes the plurality of text sentences.

Figure 4:
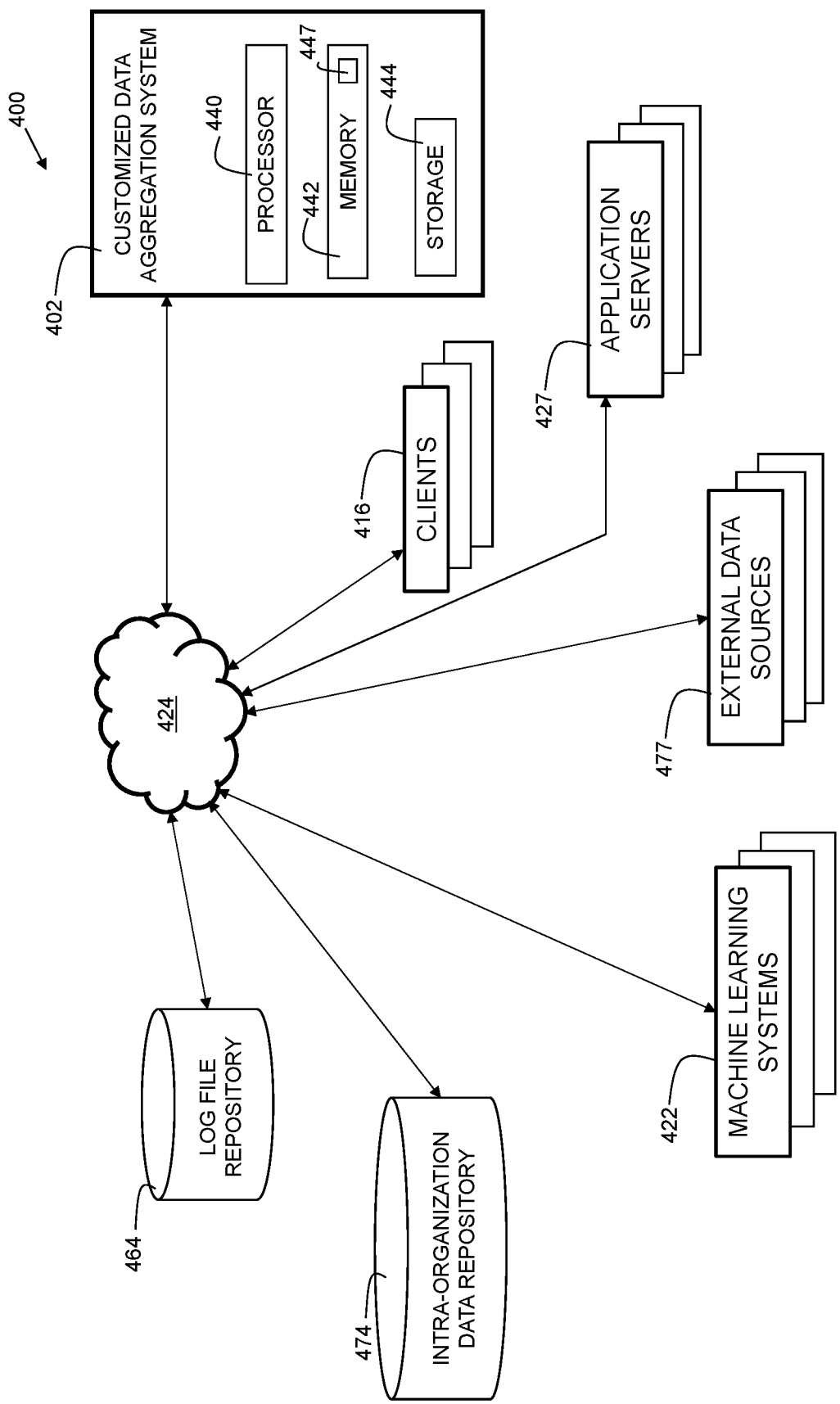
FIG. 4 is an ecosystem for embodiments of the present invention.

FIG. 4 is an ecosystem 400 for embodiments of the present invention. Customized Data Aggregation System (CDAS) 402 comprises a processor 440, a memory 442 coupled to the processor 440, and storage 444. CDAS 402 is an electronic computation device. The memory 442 contains program instructions 447, that when executed by the processor 440, perform processes, techniques, and implementations of disclosed embodiments. Memory 442 can include dynamic random-access memory (DRAM), static random-access memory (SRAM), magnetic storage, and/or a read only memory such as flash, EEPROM, optical storage, or other suitable memory, and should not be construed as being a transitory signal per se. In some embodiments, storage 444 may include one or more magnetic storage devices such as hard disk drives (HDDs). Storage 444 may additionally include one or more solid state drives (SSDs). The CDAS 402 is configured to interact with other elements of ecosystem 400. CDAS 402 is connected to network 424, which can include the Internet, a wide area network, a local area network, and/or other suitable network.

Ecosystem 400 may include one or more client devices, indicated as 416. Client device 416 can include a laptop computer, desktop computer, tablet computer, smartphone, or other suitable computing device. Client device 416 may be used to receive information from, and/or configure CDAS 402.

Ecosystem 400 may include one or more application servers 427. The application servers 427 may implement HTML-based user interfaces and provide backend functionality to support enterprise-level applications for business functions, such as inventory tracking, sales tracking, manufacturing tracking, virtual meetings, education, e-commerce, banking, and/or financial applications, to name a few. The application servers 427 may be configured to generate log files during their operation that can be stored in log file repository 464, which is a repository of log files from one or more applications. The log file repository 464 can include log files from one or more of the applications executing on application servers 427 within ecosystem 400. In one or more embodiments, the CDAS 402 provides one or more log files from log file repository 464 to machine learning systems 422. The machine learning systems 422 may perform natural language processing (NLP) on one or more log files, and convert log lines into a more human-readable form, such as sentence prose, for inclusion in output data of the CDAS 402.

Natural Language Processing (NLP) is a subfield of artificial intelligence that involves teaching computers to understand, interpret, and generate human language. NLP works by breaking down human language into its constituent parts and analyzing them using various algorithms and techniques. In one or more embodiments, the NLP process includes tokenization, which can include breaking down a piece of text into individual words or phrases. The NLP process can further include Part-of-speech (POS) tagging. POS tagging can include analyzing each token and assigning it a part of speech, such as noun, verb, adjective, or adverb. The NLP process can further include parsing, which involves analyzing the syntactic structure of a sentence to identify the relationships between the words and phrases. The process can include entity detection, which involves identifying and categorizing named entities in a piece of text, such as people, places, organizations, and dates. One or more embodiments can include performing sentiment analysis. The sentiment analysis can include analyzing the overall sentiment or emotional tone of a piece of text, such as whether it is positive, negative, or neutral. Finally, the results of the NLP process may be further refined using post-processing techniques such as entity co-reference resolution and/or disambiguation.

Ecosystem 400 may include one or more machine learning systems 422. The machine learning systems 422 can include, but are not limited to, a convolutional neural network (CNN), Recurrent Neural Network (RNN), Long Short Term Memory Network (LSTM), Radial Basis Function Network (RBFN), Multilayer Perceptron (MLP), Gradient Boosted Network, and/or other suitable neural network types. The machine learning systems 422 can provide classification functions, such as image classification, facial recognition, and/or other features for identifying objects in digital content such as text, audio, images, and/or video content, as well as other types of media. The machine learning systems 422 may also provide natural language processing (NLP) functionality for performing entity detection, disambiguation, and/or other functions to summarize, and/or categorize natural language by topic, relevance, and/or other criteria.

In some embodiments, the CDAS 402 may orchestrate training of, and/or inputting data to, machine learning systems 422. The data can include data from an intra-organization data repository 474. The data in intra-organization data repository 474 can include company-private data. The data can be in a variety of formats, including, but not limited to, SQL, CSV, XML, text, YAML, and/or other suitable formats.

Ecosystem 400 can include one or more external data sources 477. The one or more external data sources 477 can include social media systems, search engines, publicly available online databases, news feeds, and so on. In one or more embodiments, the CDAS 402 scrapes data from the external data sources 477 to include portions of the external data sources 477 in a customized data output.

In one or more embodiments, the aggregation process includes utilizing NLP and/or entity detection to determine a corresponding domain for information. For example, if entity detection determines that the subject matter of text, audio, and/or video content is primarily in the domain of applications, then a metadata structure can be associated with, and/or appended/prepended to the content. The metadata can include a domain field, indicating which domain the content belongs to. The CDAS 402 then uses the metadata to assemble information in percentages that are computed based on user-assigned scores for each domain.

Figure 5:
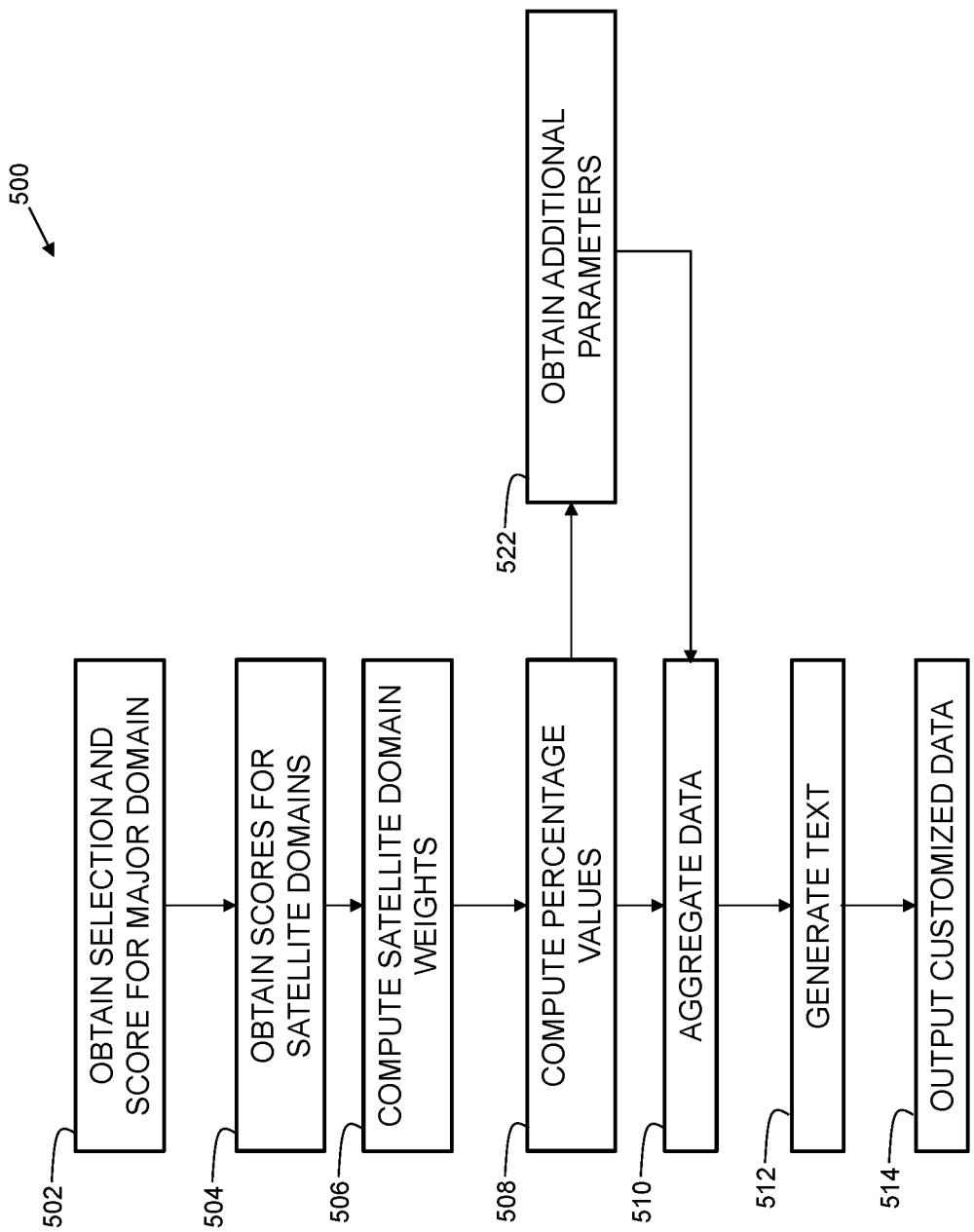
FIG. 5 is a flowchart for embodiments of the present invention.

FIG. 5 is a flowchart 500 for embodiments of the present invention. At block 502, a selection and score for a major domain is selected. In embodiments, the score may be a value in a range from 0-5, 0-100, or other suitable range. The major domain has a score that is higher than the scores of any of the other (satellite) domains. Thus, in embodiments, scores are assigned to a plurality of domains, and the domain with the highest score is assigned to be the major domain, and the other domains are assigned as satellite domains. At block 504, scores for the satellite domains are obtained. In embodiments, there are four total domains, with one being selected as the major domain, and the remaining three being set as satellite domains. In general, there can be N domains, where N can be any positive integer number. In some embodiments, N is a number ranging from 2-4. In some embodiments, N is a number ranging from 2-10. In some embodiments, N is a number ranging from 2-100. Other ranges are possible in disclosed embodiments.

At block 506, satellite domain weights are computed. In embodiments, each satellite domain weight is computed by computing a square root of the difference between a square of the major domain score and a corresponding satellite domain score. This can be denoted by the formula:

$$Wi = SQRT((Sm)^2 - Si)$$

Where Wi is the weight for satellite domain i, and Sm is the score for the major domain, and Si is the score for satellite domain i. The scores of the domains are indicative of a semantic importance, i.e., the importance of the domain to the user in terms of the information he/she is interested in. In embodiments, the major domain score is set to an integer value M, and each satellite domain is set to a score ranging from 1 to M−1, where 1 indicates a more important domain, and higher values, up to M−1 indicate a less important domain. Thus, in embodiments, the weights Wi are mathematical distances between a given satellite domain and the major domain. Other embodiments may use different algorithms and/or formulas for computing weights instead of, or in addition to, the aforementioned formula.

At block 508 percentage values are computed. In one or more embodiments, the percentage values are computed by computing a sum of all weights, including the weight of the major domain, and then computing a percentage for each domain (major domain and all satellite domains) based on the sum. In one or more embodiments, the percentages are used to determine how much information from a given domain is included in customized data that is output. In one or more embodiments, the major domain weight is computed as the square of the score of the major domain. As an example, a major domain score of four results in a major domain weight of 16.

Optionally, at block 522, additional parameters are obtained. The additional parameters can include additional filtering criteria to further improve relevance of the customized data that is output. In one or more embodiments, the additional parameters can include a time range. The time range can be used to obtain information pertinent to a given time interval. In one or more embodiments, the time range can have a value ranging from one hour to one year, or any other suitable time range. The additional parameters can include at least one location. In one or more embodiments, a list of geographical locations can be provided via a user interface. The list of geographical locations can be used to obtain information pertinent to one or more geographical locations. Other additional parameters can be obtained in one or more embodiments, including, but not limited to, a person of interest, a topic of interest, and so on.

Embodiments can include obtaining a time range, wherein the aggregating is further based on the time range. In embodiments, obtaining the time range comprises obtaining a time range having a duration ranging from one hour to one month. In some embodiments, obtaining the time range comprises obtaining a time range having a duration ranging from one hour to one year. Embodiments can include obtaining at least one location, wherein the aggregating is further based on the at least one location.

At block 510 data is aggregated. The data may be stored in a repository such as a database. The data may include text data, audio data, image data, video data, and/or other suitable types of data. The aggregated data can be further processed by machine learning systems 422 in order to perform entity detection, disambiguation, and/or other natural language processing operations to further refine the aggregated data to include the most relevant information based on the domain scores and optional additional parameters (if present).

At block 512, text is generated, based on the data aggregated at block 510. In one or more embodiments, the text is generated as sentence prose. The sentence prose can include one or more related sentences that resemble an article or news bulletin. In one or more embodiments, the text is generated using NLP processes. The NLP processes can be implemented on one or more machine learning systems 422. In one or more embodiments, the text may be generated in multiple languages, such as English, Spanish, French, Chinese, etc.

At block 514, customized data is output. The customized data can be output to one or more client devices, such as indicated at 416 of FIG. 4. The client devices can include desktop computers, laptop computers, tablet computers, smartphones, wearable computers, and so on. The customized data can include text, audio, images, video, interactive content, and so on. The customized data can include one or more hyperlinks to additional source data. The source data can include links to html pages on a company intranet, the Internet, and/or other sources. The source data enables a user to obtain additional information regarding an article within the customized data.

FIG. 6 is a table 600 showing example datasets in accordance with embodiments of the present invention. Table 600 includes four columns, indicated as 602, 604, 606, and 608. Table 600 includes five rows, indicated as 612, 614, 616, 618, and 622. A domain column 602 includes a list of domains for consideration in generating customized data for output. While four domains are shown in table 600, in practice, there can be more or fewer domains. At column 602, row 612, there is a first domain, with a subject of business. At column 602, row 614, there is a second domain, with a subject of IT (information technology). At column 602, row 616, there is a third domain, with a subject of applications. At column 602, row 618, there is a fourth domain, with a subject of End User. For convenience in explaining disclosed embodiments, each domain may have a variable associated with it. In the example of FIG. 6, the business domain is assigned a variable 'b,' the IT domain is assigned a variable 'i,' the application domain is assigned a variable 'a,' and the End User domain is assigned a variable 'e.' Note that the domains shown in FIG. 6 are exemplary, and the number and/or types of domains may differ. In an embodiment, the number and/or types of domains may be a user-selectable option. In embodiments, domains can include, but are not limited to, business, IT, human resources (HR), finance, customer resource management (CRM), assets, accounting, inventory, supply chain, social media, and/or others.

Continuing with the example of FIG. 6, the business domain can include topics pertaining to general business conditions, such as business trends, inflation rates, stock market indices, currency exchange rates, legislation, and so on. The business domain can also include company-private data, such as sales figures, inventory, and the like. Similarly, the IT domain can include topics such as network outages, cybersecurity issues, and so on. Similarly, the applications domain can include topics such as the status of particular applications, upgrade schedules, scheduled downtime, new features, and so on. Similarly, the End User domain can include topics such as issues impacting end users, system outages, new policies, and so on. Note, there can be some overlap between some of the domains, in terms of subject matter.

Column 604 shows a corresponding score for each domain. Each domain is given a score, which is indicative of the semantic importance of the subject matter associated with the domain. In an embodiment the score can be assigned by a user. In any case, the domain with the highest value is deemed as the major domain. At column 604, row 612, there is a score of 3, associated with the domain of business. At column 604, row 614, there is a score of 3, associated with the domain of IT. At column 604, row 616, there is a score of 4, associated with the domain of application. At column 604, row 618, there is a score of 1, associated with the domain of End User. These scores can be user-provided, via a user interface. As the domain of applications has the highest score (4, as shown at column 604, row 616), the applications domain is the major domain. In disclosed embodiments, software implementing a user interface can enforce a logic rule such that one, and only one domain is permitted to have a maximum score, thus ensuring there is only one, unambiguous major domain. Continuing with the example of FIG. 6, as the applications domain is the major domain, the remaining domains of business, IT, and End User, are categorized as satellite domains.

Once the scores are established by a user, as shown in column 604, a corresponding weight for each domain is computed, and shown in column 606. For the major domain, the weight is the square of the score. Thus, in the example of FIG. 6, the major domain is indicated at row 616 with a score of 4 as shown in column 604, and thus the weight for the major domain is 4*4=16, as indicated at column 606 row 616. In one or more embodiments, for the satellite domains, a lower weight can correspond to a higher rank. For each of the satellite domains, the weight is computed as the square root of the difference between the score of a square of the major domain, and the score of the corresponding satellite domain. As an example, the score for the domain of End User is 1, as indicated in column 604, row 618. Therefore, the weight for the domain of End User is computed as sqrt (4^2−1)=sqrt (15)=3.873. For the domains of business and IT, the assigned score is 3, as indicated in column 604, rows 612 and 614. Therefore, the weight for both the domains of business and IT are computed as:

sqrt(4^2−3)=sqrt(13)=3.606.

Percentage values are computed for each domain, as shown in column 608, based on the weights in column 606. The weights in column 606 at rows 612, 614, 616, and 618 are summed, and the total is shown in column 606, row 622. The percentage value in column 608 is based on the total at column 606 row 622. For the major domain at row 616, the percentage value is 16/27.08=0.59*100. The percentage values for the satellite domains indicated in rows 612, 614, and 618 are computed in a similar manner. The percentage values in column 608 are used as criteria for determining the number of items from each domain to include in the output customized data. In the example of FIG. 6, approximately 59 percent of the included information is based on the application domain in row 616, approximately 14 percent of the included information is based on the End User domain in row 618, and approximately 13 percent of the included information is based on the business domain and IT domain in row 612 and row 614, respectively. The user can adjust the scores for each domain via a user interface, to enable control over the customized data that is output by disclosed embodiments.

Figure 7:
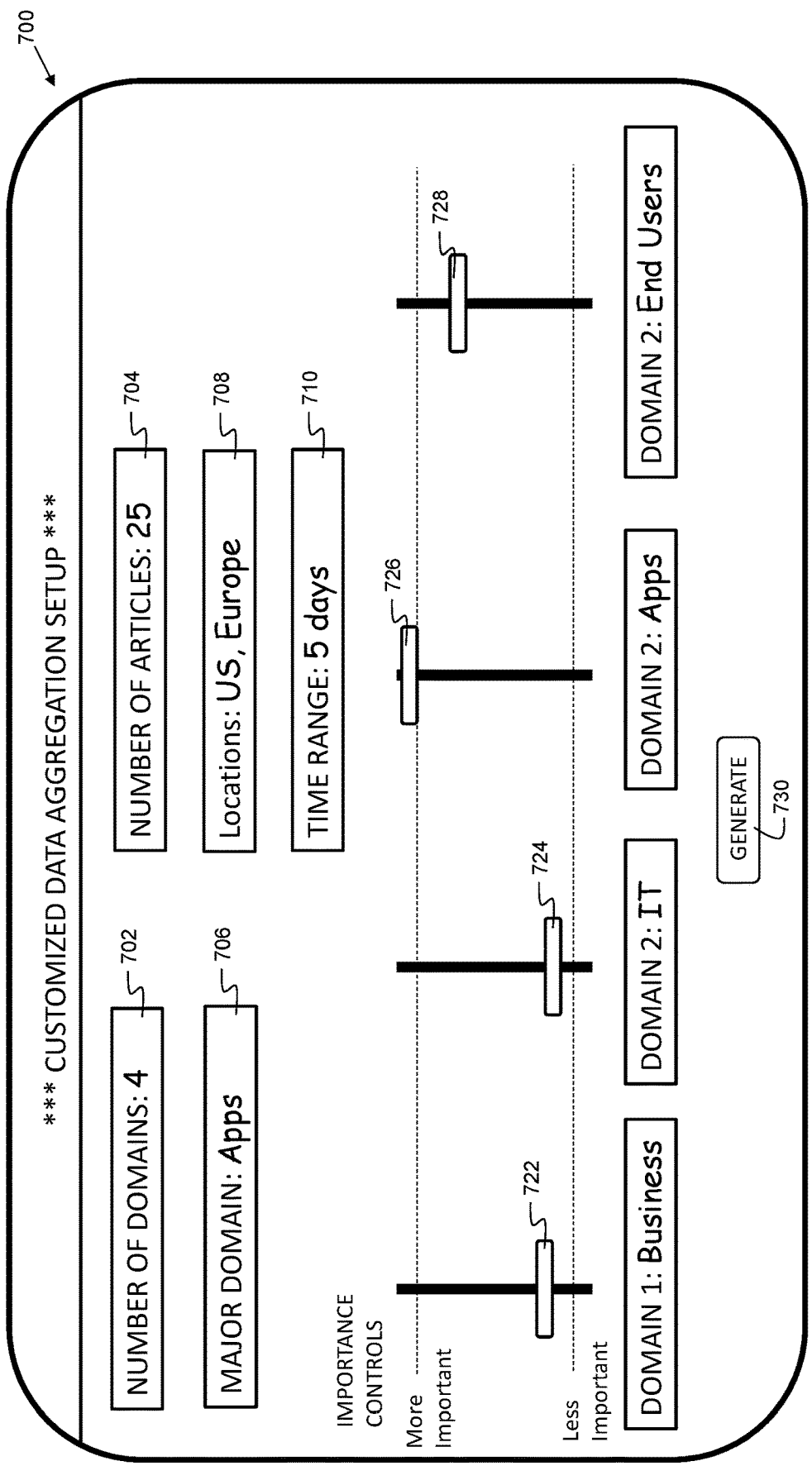
FIG. 7 is a sample user interface for domain configuration in accordance with embodiments of the present invention.

FIG. 7 is a sample user interface 700 for domain configuration in accordance with embodiments of the present invention. A number of domains is entered at field 702. In the example, the number of domains is 4. However, embodiments may have more or fewer domains. A number of articles is entered in field 704. The number of articles is the maximum number of individual stories to be included within the customized data. The customized data may be in a news bulletin format, with information organized similar to an online newspaper or online newsletter. In embodiments, the number of articles may be a value ranging from 3 to 100. Other value ranges for the number of articles are possible in disclosed embodiments.

A location list is entered at field 708. This data is optional. When the location list is present, information associated with one or more of the locations in the list is prioritized for inclusion in the customized data that is output by disclosed embodiments. In embodiments, using NLP, along with entity detection, location relevance is extracted from content, and content that does not include one or more locations specified at field 708 is excluded from the customized data that is output. A time range is entered at field 710. This data is optional. When the time range is present, information associated with the time range specified in field 710 is prioritized for inclusion in the customized data that is output by disclosed embodiments. In embodiments, using NLP, along with entity detection, time and/or date relevance information is extracted from content, and content that does not include time within the range specified at field 710 is excluded from the customized data that is output.

The user interface 700 can include a plurality of importance controls. As shown in FIG. 7, there is a control 722 for the business domain, a control 724 for the IT domain, a control 726 for the applications domain, and a control 728 for the End Users domain. In one or more embodiments, the user selects a domain as the major domain in field 706. The control 726 of the major domain (applications) is set to a maximum importance setting. The user can then manipulate the controls for the satellite domains (722, 724, and 728) based on the desired importance. In embodiments, the position/setting of the controls affects the value of the score in column 604 of table 600. Once the controls are set at the desired value, the user can invoke the generate button 730 to cause the CDAS 402 (FIG. 4) to compute weights and percentage values as shown in FIG. 6, and then aggregate data from multiple domains based on the computed percentage values.

Figure 8:
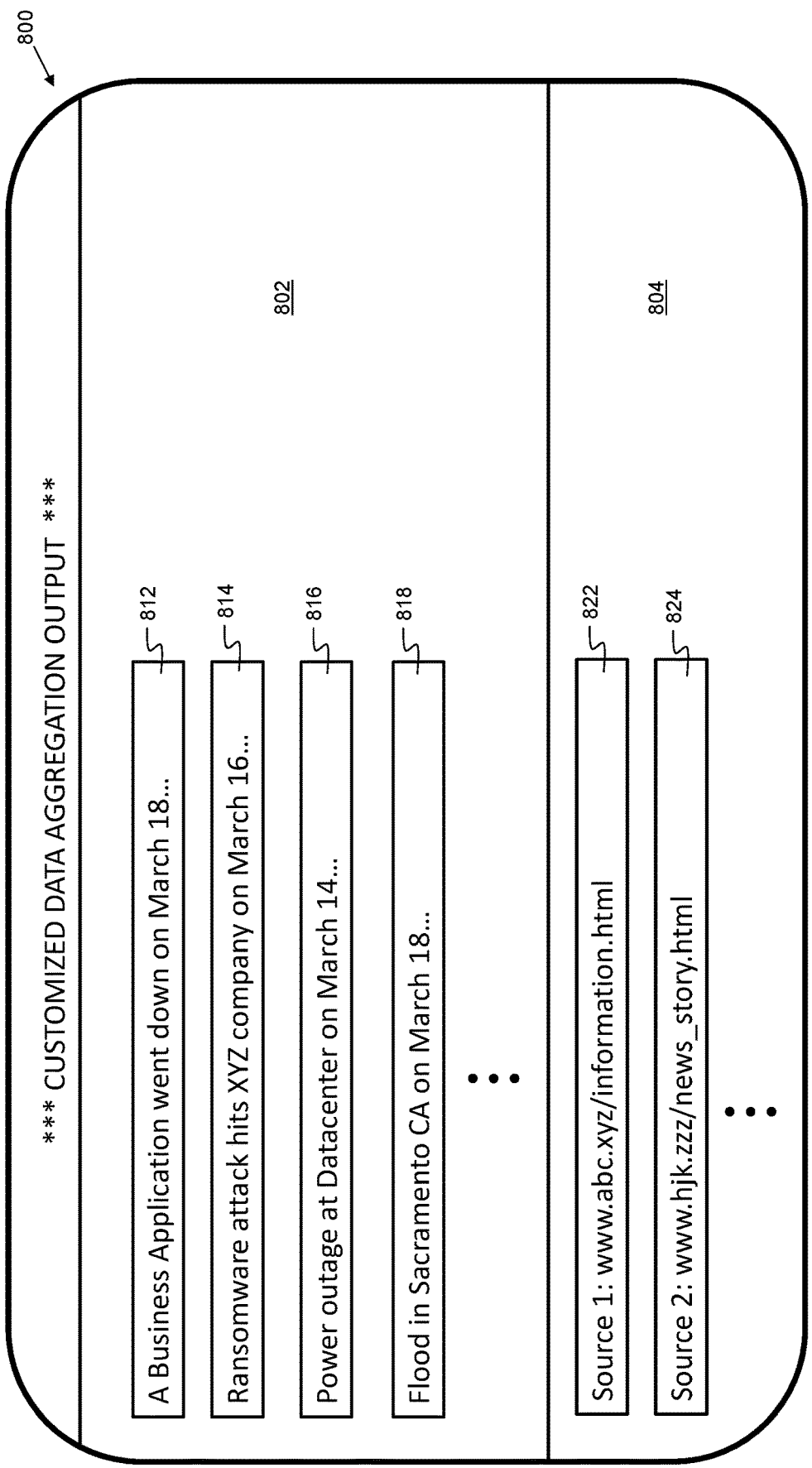
FIG. 8 is an exemplary output of customized data in accordance with embodiments of the present invention.

FIG. 8 is an exemplary output user interface 800 of customized data in accordance with embodiments of the present invention. The user interface 800 includes an articles section 802, and a references section 804. Within the articles section 802, four articles are shown, indicated as 812, 814, 816, and 818. In one or more embodiments, a user can click, tap, or otherwise select one of the articles to expand the article to view the article in its entirety. While four articles are shown in the user interface 800 of FIG. 8, in practice there can be more or fewer articles. In embodiments, a user can specify a maximum number of articles to include in customized data, such as is shown in field 704 of FIG. 7. In one or more embodiments, the percentages of domains of the articles are based on the percentages computed such as shown in column 608 of FIG. 6. Thus, using data from the example shown in FIG. 6, about 59 percent of the articles come from the application domain.

Within the references section 804, links to source information for some or all of the articles are shown at 822 and 824. In one or more embodiments, a user can click, tap, or otherwise select a source link to expand view details of source information that was used as a basis for creation of an article included in section 802. In one or more embodiments, at least once source link is included in the customized data. The source links included in section 804 can reference data tables, text information, images, audio information, video information, and/or other types of information that was aggregated and used for creation of one or more of the articles in section 802. In this way, a user can view additional details if he/she wants to learn more about the topic(s) covered in one or more articles shown in section 802.

The are numerous scenarios in which disclosed embodiments can provide additional information. As one example, there are multiple sales team members that reported an issue with their connectivity to enterprise business applications on a given date and time range. Stakeholders may desire to investigate other events that happened during that time range in the domains of application, network and devices, so that they can report the events that caused the outage, as well as hold the parties responsible for any incurred business loss due to the outage.

Correlation of information amongst locations is an important factor when it comes to a global enterprise or a conglomerate that has a distributed infrastructure, and a significant number of users, applications, and/or domains. As another example, a major fire incident that occurred in a data center of manufacturing company on a given date and time triggered a failover to disaster recovery (DR) site. This incident resulted in seamless user access to DR components for some users, while other users working in other manufacturing locations for the same company experienced session terminations. In the aforementioned scenario, it can be difficult to analyze the count of users that could have been impacted by this incident across locations and assess the magnitude of data loss that resulted. Disclosed embodiments can provide important information, such as the exact number of users who got affected due to this incident, the business loss in terms of non-productive time and data loss due to this incident giving highest importance to manufacturing loss followed by data across multiple different locations. This can be accomplished by analyzing log files, and converting log files into sentence prose for inclusion in customized data that is output.

One or more embodiments may integrate with a defect tracking system to further extract relevant data. In embodiments, a description of a ticket along with log file data can be used to find relationships amongst seemingly unrelated technologies that affect key factors such as costs, price, downtime, profits, customer satisfaction, and so on. Embodiments can utilize text analytics included as part of a Natural Language Processing (NLP) tool suite.

Another use case for disclosed embodiments includes providing a correlation between technology components that relate to domains such as Web, Middleware, Database, Network, Storage, and/or hardware systems as Point of Sale (PoS)/IoT, Computer-aided manufacturing, robots, conveyer belts, chemical treatment tanks, and so on. Embodiments may utilize NLP to extract matching words that are captured from various data sources including a Helpdesk tool.

Another use case for disclosed embodiments includes correlating metrics within a single system. One such example is correlating processor performance and memory performance of a computing system. Disclosed embodiments can compare various parameters such as processor utilization, available memory, load average, and so on. These parameters can be correlated with other notable events from other domains, such as network outages, social media trends, and so on.

FIG. 9 is an exemplary log file 900 processed by embodiments of the present invention. Log files are used in computer systems to record events, errors, and other important information related to the operation of the system or specific applications. Modern computing systems and applications generate vast amounts of log files resulting from the operation of those computing systems and applications. In some cases, gigabytes of diagnostic output, in the form of various log files, may be generated.

Log file 900 includes three log lines, indicated by reference numbers 951, 952, and 953. Log files can include different levels to indicate errors, warnings, debug and diagnostic information, and/or other pieces of information about an application, network hardware, and/or other components within a system. In some embodiments, log files may rotate (start a new log) at a predetermined time schedule, such as hourly or daily. In some embodiments, log files may rotate based on a predetermined file size (e.g., 500 KB).

In line 951, at 902, a logging level field of LOGWARN is shown, which is associated with warning messages. At 904, an internet protocol (IP) address pertinent to the warning is shown. At 906, there is a date associated with the log line 951. At 908, a message is shown that corresponds to the warning. Similarly, in line 952, at 912, a logging level field of LOGERROR is shown, which is associated with error messages. At 914, an internet protocol (IP) address pertinent to the error is shown. At 916, there is a date associated with the log line 952. At 918, a message is shown that corresponds to the error. Furthermore, in line 953, at 922, a logging level field of LOGWARN is shown, which is associated with warning messages. At 924, an internet protocol (IP) address pertinent to the warning is shown. At 926, there is a date associated with the log line 953. At 928, a message is shown that corresponds to the error.

In one or more embodiments, natural language processing, such as provided by machine learning systems 422, can be used to convert log file messages into sentence prose. As an example, the log message '[18/Mar/2023:17:10:42+0000] "LoadBalancerFailover—Complete' can be converted to sentence prose such as 'The load balancer failover completed at 17:10 UTC on March 18.' In one or more embodiments, the machine learning systems 422 may be trained using supervised learning techniques. In these embodiments, multiple log files may be used as training data for the machine learning system, and corresponding sentence prose output can be evaluated for accuracy to determine the effectiveness of the training of the machine learning systems 422. Once the output is deemed to be effective, the system can be set to an operational mode, in which log files are parsed, and sentence prose is generated based on one or more statements in one or more log files. The log files can be associated with an application that has relevance for the customized data output. The log files can be from a relevant application. A relevant application can be an application that has outlier activity during a specified time frame. The outlier activity can include a number of concurrent users above or below a normal range, an excessive number of log lines generated in a log file, excessive memory usage, excessive processor utilization, and/or other activities. In the aforementioned outlier activities, a predetermined threshold can be established for each activity. The predetermined thresholds can include, but are not limited to, a maximum memory usage limit, a maximum processor utilization limit, a maximum number of log lines generated per minute, and so on. Embodiments can include identifying a relevant application; parsing a log file associated with the relevant application; converting at least one line of the log file into sentence prose; and including the sentence prose in the customized data that is output.

Figure 10:
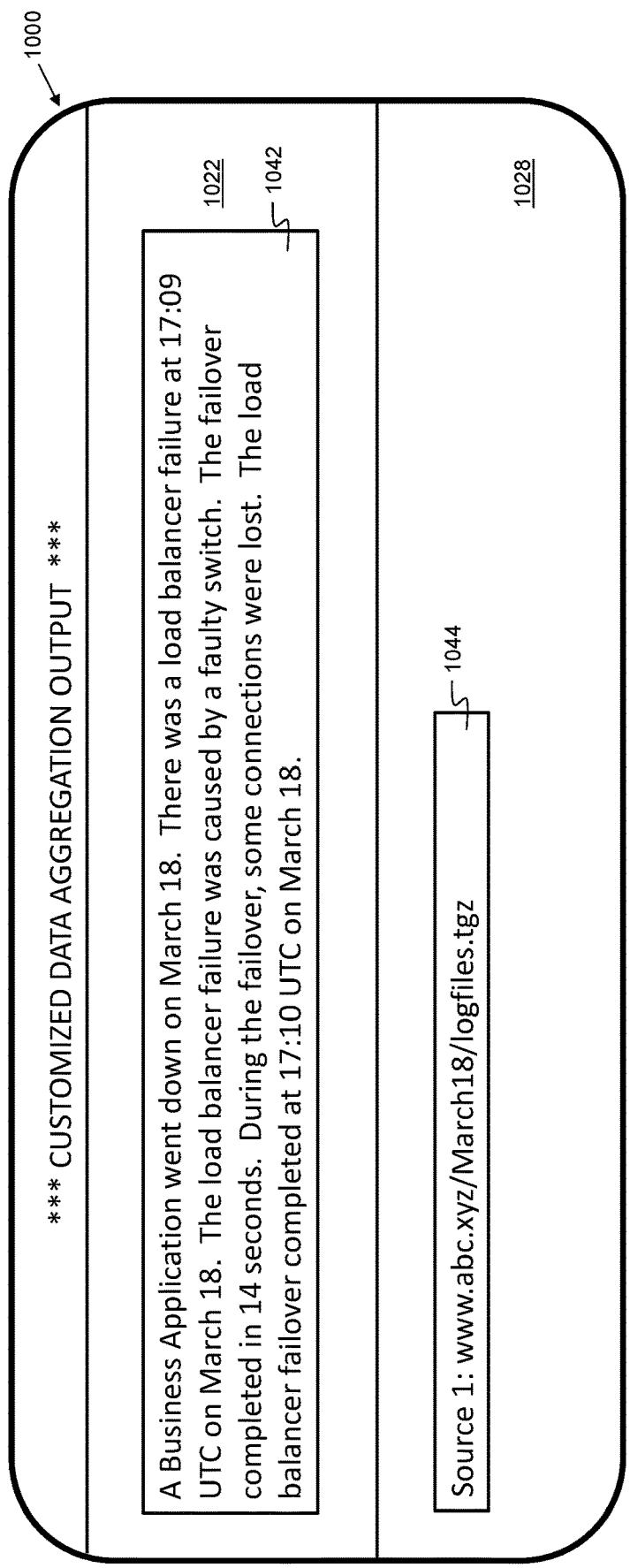
FIG. 10 is another exemplary output of customized data in accordance with embodiments of the present invention.

FIG. 10 is another exemplary user interface 1000 showing output of customized data in accordance with embodiments of the present invention. The user interface 1000 includes an article details section 1022, and a log files section 1028. The article details section 1022 includes an article detail 1042. The article detail 1042 can include a full article that is obtained by selecting an article, such as that shown at 812 of FIG. 8. Upon selection of article 812 from the user interface 800 of FIG. 8, user interface 1000 showing article detail 1042 is displayed. The article detail 1042 includes sentence prose that is generated by machine learning systems 422 using natural language processing (NLP) based on log files, such as depicted in FIG. 9. Within the log files section 1028, a link to retrieve the log files is provided, indicated at 1044. This enables a user to conveniently view additional details regarding an incident with an application. Other embodiments can further include an option to view log files and/or relevant segments of log files that the article detail 1042 is based on.

User interfaces such as those depicted in FIG. 7, FIG. 8, and FIG. 10, can be implemented via a web-based interface, a mobile application, and/or other suitable user interface framework. The user interface framework can include React, Angular, Vue.js, Xamarin, C #, .NET, and/or other suitable protocols and/or packages. The user interface arrangements depicted in FIG. 7, FIG. 8, and FIG. 10 are exemplary, and other user interface elements and/or arrangements are possible in disclosed embodiments.

As can now be appreciated, disclosed embodiments provide techniques for providing important information covering key events within an enterprise utilizing an algorithm that allows a user to obtain information regarding root causes and/or potential impacts of those events. The major domain and satellite domains operate in a manner that utilizes a 'QBee' (Queen Bee) mode of operation in which the algorithm provides a weighted importance to one or more domains that represent an area of focus. Thus, disclosed embodiments provide improvements in the technical field of data aggregation, and can provide a quicker and more efficient ingest of information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for arranging output displayed on a client computer, comprising:
computing by a processor, for a major domain and a set of satellite domains, a respective plurality of domain weights based on a score for the major domain and a set of scores respective to the set of satellite domains, wherein the plurality of satellite domain weights is computed by computing a square root of a difference between a square of the major domain score and a corresponding satellite domain score;
computing by the processor a respective plurality of percentage values based on the plurality of domain weights;
aggregating data by the processor, wherein the aggregating is based on individual computed percentage values of the plurality of percentage values; and
causing to display on the client computer, using natural language processing, customized data having a plurality of text sentences generated based on the aggregated data, the plurality of text sentences summarizing information from at least one of the major domain and the set of satellite domains, wherein an amount of the customized data of the major domain displayed on the client computer is based at least in part on a portion of the plurality of domain weights for the major domain while a lesser amount of the customized data of the set of satellite domains displayed on the client computer is based at least in part on a different portion of the plurality of domain weights for the set of satellite domains, thereby improving a user experience by displaying the customized data to represent an area of focus.

2. The method of claim 1, further comprising including at least once source link in the customized data.

3. The method of claim 1, further comprising:
obtaining a time range, wherein the aggregating is further based on the time range.

4. The method of claim 3, wherein obtaining the time range comprises obtaining a time range having a duration ranging from one hour to one month.

5. The method of claim 1, further comprising:
obtaining at least one location; and
wherein the aggregating is further based on the at least one location.

6. The method of claim 1, further comprising:
identifying a relevant application;
parsing a log file associated with the relevant application;
converting at least one line of the log file into sentence prose; and
including the sentence prose in the customized data that is output.

7. An electronic computation device comprising:
a processor;
a memory coupled to the processor, the memory containing instructions, that when executed by the processor, cause the electronic computation device to:
compute, for a major domain and a set of satellite domains, a respective plurality of domain weights based on a score for the major domain and a set of scores for the set of satellite domains, wherein the plurality of satellite domain weights is computed by computing a square root of a difference between a square of the major domain score and a corresponding satellite domain score;
compute a respective plurality of percentage values based on the plurality of domain weights;
aggregate data, wherein the aggregating is based on individual computed percentage values of the plurality of percentage values; and
cause to display on the client computer, using natural language processing, customized data having a plurality of text sentences generated based on the aggregated data, the plurality of text sentences summarizing information from at least one of the major domain and the plurality of satellite domains, wherein an amount of the customized data of the major domain displayed on the client computer is based at least in part on a portion of the plurality of domain weights for the major domain while a lesser amount of the customized data of the set of satellite domains displayed on the client computer is based at least in part on a different portion of the plurality of domain weights for the set of satellite domains, thereby improving a user experience by displaying the customized data to represent an area of focus.

8. The electronic computation device of claim 7, wherein the memory further comprises instructions, that when executed by the processor, cause the electronic computation device to include at least once source link in the customized data.

9. The electronic computation device of claim 7, wherein the memory further comprises instructions, that when executed by the processor, cause the electronic computation device to:
obtain a time range; and
perform the aggregating based on the time range.

10. The electronic computation device of claim 9, wherein the memory further comprises instructions, that when executed by the processor, cause the electronic computation device to obtain the time range by obtaining a time range having a duration ranging from one hour to one month.

11. The electronic computation device of claim 7, wherein the memory further comprises instructions, that when executed by the processor, cause the electronic computation device to perform entity detection as part of the natural language processing.

12. The electronic computation device of claim 7, wherein the memory further comprises instructions, that when executed by the processor, cause the electronic computation device to:
identify a relevant application;
parse a log file associated with the relevant application;
convert at least one line of the log file into sentence prose; and
include the sentence prose in the customized data that is output.

13. A computer program product for an electronic computation device comprising a computer readable storage medium having program instructions embodied therewith, the program instructions executable by a processor to cause the electronic computation device to:
compute, for a major domain and a set of satellite domains, a respective plurality of domain weights based on a score for the major domain and a set of scores for the set of satellite domains;
compute a respective plurality of percentage values based on the plurality of domain weights;
aggregate data, wherein the aggregating is based on individual computed percentage values of the plurality of percentage values; and
cause to display on the client computer, using natural language processing, customized data having a plurality of text sentences generated based on the aggregated data, the plurality of text sentences summarizing information from at least one of the major domain and the plurality of satellite domains, wherein an amount of the customized data of the major domain displayed on the client computer is based at least in part on a portion of the plurality of domain weights for the major domain while a lesser amount of the customized data of the set of satellite domains displayed on the client computer is based at least in part on a different portion of the plurality of domain weights for the set of satellite domains, thereby improving a user experience by displaying the customized data to represent an area of focus.

14. The computer program product of claim 13, wherein the computer readable storage medium includes program instructions executable by the processor to cause the electronic computation device to:
obtain a time range; and
perform the aggregating based on the time range.

15. The computer program product of claim 13, wherein the computer readable storage medium includes program instructions executable by the processor to cause the electronic computation device to:
obtain at least one location; and
perform the aggregating based on the at least one location.

16. The computer program product of claim 13, wherein the computer readable storage medium includes program instructions executable by the processor to cause the electronic computation device to:
identify a relevant application;

parse a log file associated with the relevant application;
convert at least one line of the log file into sentence prose; and
include the sentence prose in the customized data that is output.

17. The computer program product of claim 16, wherein the computer readable storage medium includes program instructions executable by the processor to cause the electronic computation device to identify the relevant application by identifying outlier activity during a specified time frame.

18. The computer program product of claim 13, wherein the computer readable storage medium includes program instructions executable by the processor to cause the electronic computation device to include at least once source link in the customized data.

* * * * *